Aug. 28, 1934.  H. G. JENNINGS ET AL  1,971,486
TILT AND PANNING HEAD FOR MOTION PICTURE CAMERA TRIPODS
Filed Feb. 18, 1933   3 Sheets-Sheet 1
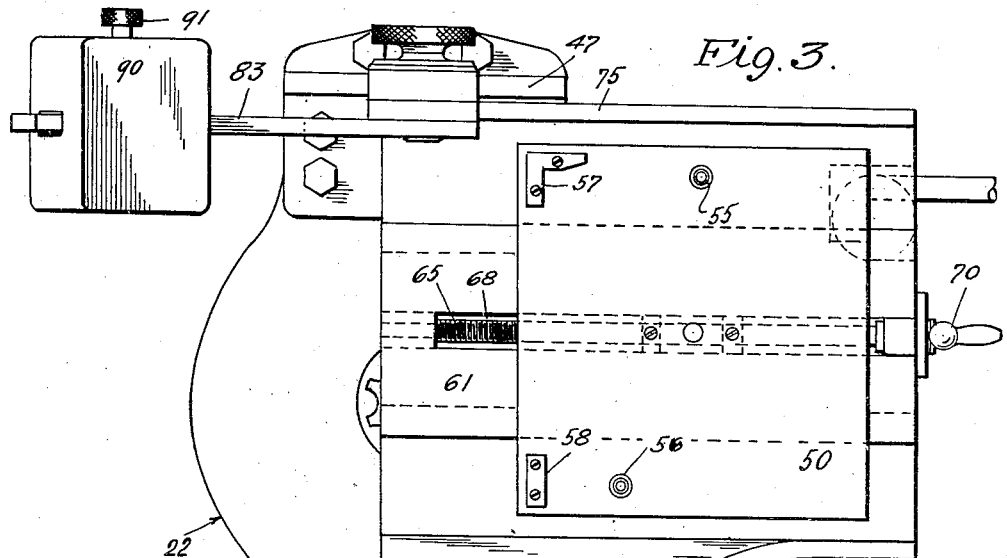
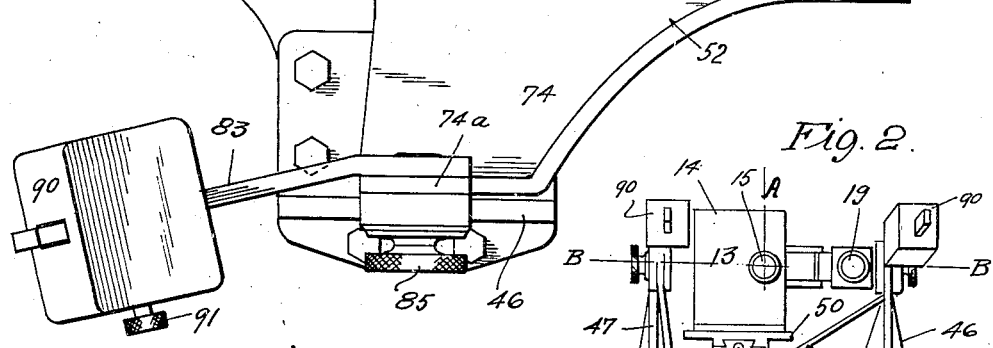
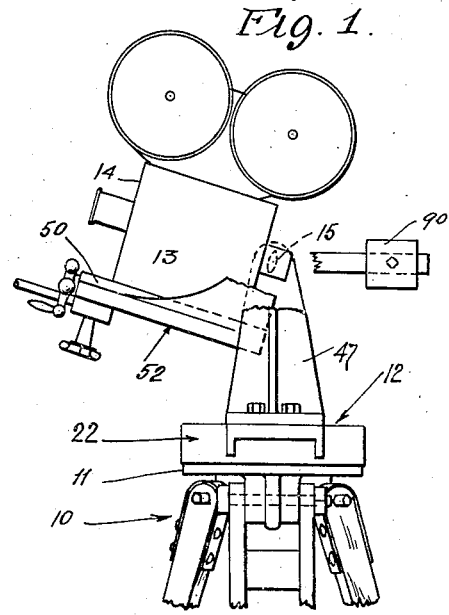
Inventors.
Henry Gordon Jennings.
Arthur Smith
William F. Rudolph.
Lewis L. Mellor.
Attorney.

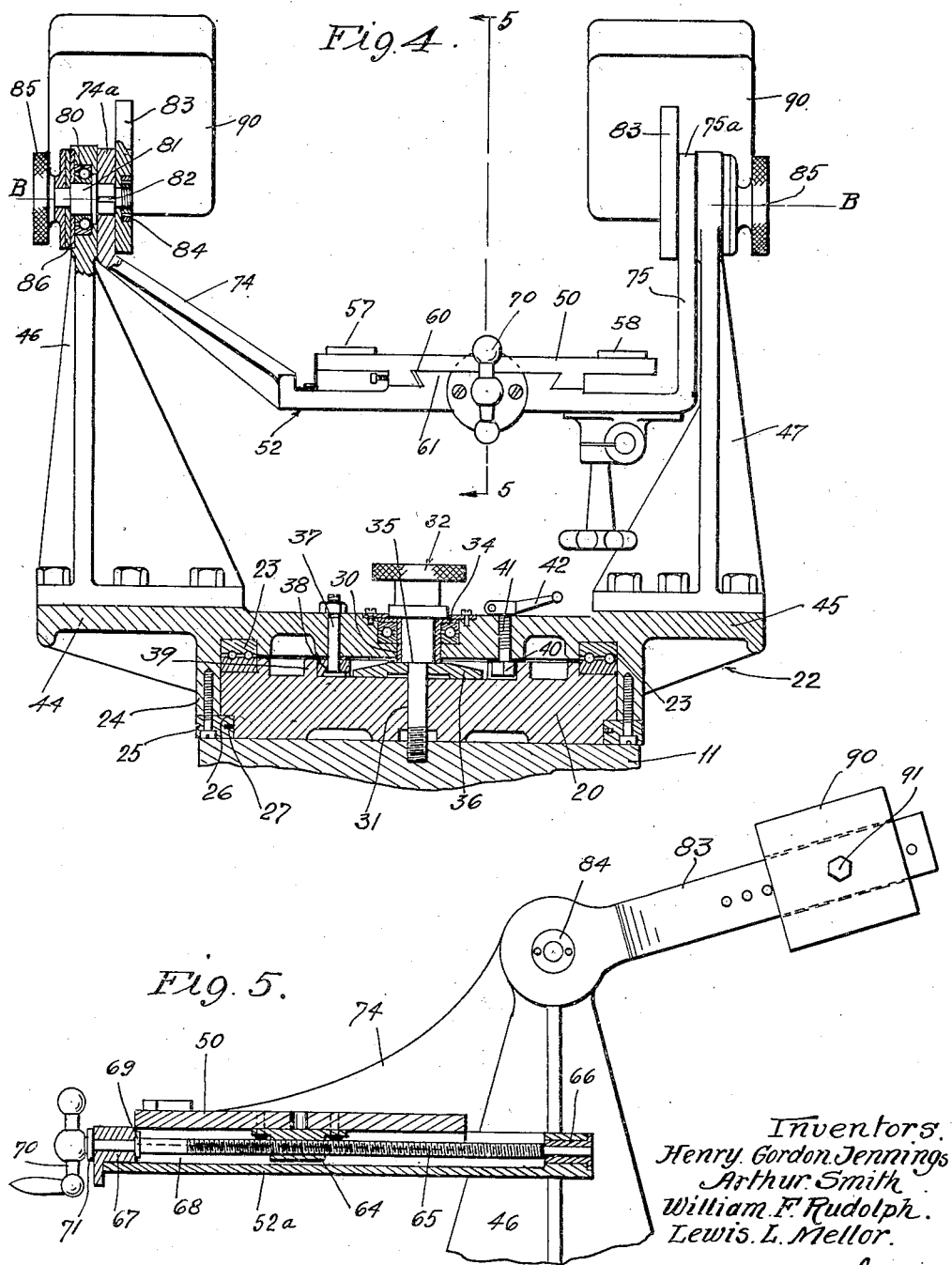

Aug. 28, 1934.   H. G. JENNINGS ET AL   1,971,486
TILT AND PANNING HEAD FOR MOTION PICTURE CAMERA TRIPODS
Filed Feb. 18, 1933    3 Sheets-Sheet 3

Inventors.
Henry Gordon Jennings.
Arthur Smith.
William F. Rudolph.
Lewis L. Mellor.

Attorney.

Patented Aug. 28, 1934

1,971,486

UNITED STATES PATENT OFFICE 1,971,486

TILT AND PANNING HEAD FOR MOTION PICTURE CAMERA TRIPODS

Henry Gordon Jennings and Lewis L. Mellor, Los Angeles, and William F. Rudolph, Van Nuys, and Arthur Smith, Los Angeles, Calif., assignors to Paramount Productions, Inc., Los Angeles, Calif., a corporation of Delaware Application February 18, 1933, Serial No. 657,386

5 Claims. (Cl. 88—16)

This invention has general reference to motion picture camera tilting and panning tripod heads, particularly for use in trick and composite photography, as for example in taking panning or tilting shots of scenes made up with composed miniatures placed in the foreground, or with the projection background method.

The primary purposes of the present invention may best be understood by first describing one of the typical situations to which the invention applies. The method of utilizing miniatures in composition with full size sets, for example, is well understood in the art. When it is desired to show in the background some object such as a large building, or some particular scene, or portion of a room, for example, that bit of the background is constructed to a very small scale, and to proper perspective, as a "miniature", and this miniature is then placed comparatively close to the camera, between the camera and the life size balance of the scene, at the proper distance to give an accurate composed whole. It will be obvious that this miniature must be placed in the scene in accurate alinement with reference to the axis of the camera lens and that should the camera lens be subsequently shifted to one side or the other or up or down relative to its initial position, the accurate line-up between the miniature and the balance of the scene, as regards the new position of the camera lens, is destroyed. This condition has made it heretofore impossible to take a tilting or panning shot of a scene having a miniature composed therein, since the tripod as heretofore constructed carries the camera lens through a horizontal arc when the tripod is moved for horizontal panning, and through a vertical arc in vertically moving or tilting shots.

It may now be stated that the object of the present invention is to provide a tripod which will support a camera in a manner such as not to alter the line-up of objects composed in a scene during tilting or panning shots.

In accordance with the present invention, the tripod is so arranged that the camera body swings horizontally and vertically for panning and tilting shots on a fixed pivot point directly at the photographic lens of the camera and coinciding with the rear nodal point of the lens, i. e., the nodal point of emergence; and when the camera swings on this point as a center, the entering and emerging field angles corresponding with objects at different distances from the camera remain conjugate to one another, and the accurate line-up of miniature and action or background objects is preserved.

The present invention involves certain additional objects and corresponding features of construction and arrangement directed to carrying out in a practicable manner the ends discussed above, all of which will appear and be fully understood from the following detailed description of a present preferred embodiment of the invention, reference for this purpose being had to the accompanying drawings, wherein:

Fig. 1 is a side elevation of the tripod with a motion picture camera mounted thereon, parts of the tripod being broken away to reveal the position of the camera lens;

Fig. 2 is a front elevation of the tripod with a motion picture camera mounted thereon;

Fig. 3 is a top plan view of the tripod head, the camera being removed;

Fig. 4 is a rear elevation of the tripod head, the base casting and a cradle arm trunnion being shown in vertical medial section.

Fig. 5 is a section taken on line 5—5 of Fig. 4;

Figure 7:
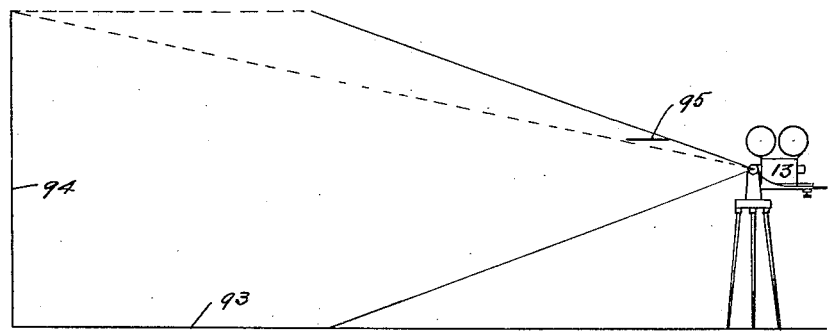
Fig. 7 is a diagrammatic view of a top miniature composed in a set, illustrating a typical use of the camera tripod.
Figure 6:
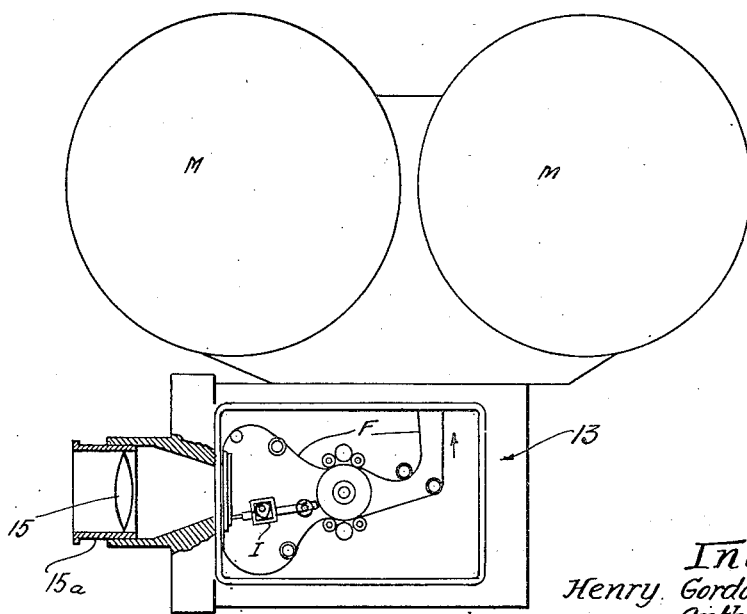
Fig. 6 is a diagrammatic view of a conventional motion picture camera.

In the drawings numeral 10 designates the upper portion of a usual tripod having a head plate 11, and the numeral 12 designates the special tilting and panning head of the present invention, head 12 being mounted on tripod head plate 11, and carrying a motion picture camera conventionally illustrated in Figs. 1 and 2 at 13. Camera 13 is shown as having a body 14 and a photographic lens objective 15 mounted in lens barrel 15a. Objective 15 is here illustrated as a single lens, although it will usually be made up as a combination of lenses; but such a combination, as is well known, has definite incident and emergent nodal points as does a simple lens. The photographic objective will accordingly be herein referred to simply as the photographic lens, and reference to the nodal points of the lens will be understood to imply the nodal points of whatever photographic lens combination may be employed. The film F is shown taken from magazine M and moved intermittently, by means of intermittent movement I mounted in the camera body, downwardly behind the photographic lens 15. The camera is shown with a usual view finder 19 mounted along one of its sides. The details of these camera parts are well known and need no further description here.

In Fig. 4 numeral 20 designates a circular base plate which rests down on the head plate 11 of the tripod proper, and is secured thereto against rotation as will appear. Mounted to rotate on circular plate 20 is the base casting 22 of the tilting and panning head. This base casting rides on an anti-friction bearing 23 provided between it and plate 20, and is formed with a downwardly extending flange 24 around the periphery of plate 20, a free running fit between said flange 24 and the periphery of plate 20 of course being provided. To the lower side of flange 24 is secured a retaining ring 25 that projects inwardly below a downwardly facing shoulder 26 on plate 20 to hold the base in assembly. It will be understood that ring 25 runs freely on plate 20, and the ring may be provided with an oil packing as at 27 if desired.

Base casting 22 and plate 20 are drilled centrally as at 30 and 31, respectively, to take a hold down screw 32 that screw threads into the head plate 11 of the tripod. An anti-friction bearing 34 is provided between screw 32 and casting 22, as shown. The lower portion of screw 32 is reduced to provide a shoulder 35, which shoulder bears down against a thrust washer 36 and forces it into tight engagement with plate 20, thereby binding plate 20 against rotation on tripod head plate 11. Thus the base casting 22 is mounted to rotate in a horizontal plane about a central vertical axis, which may be designated as axis A—A. For the purpose of releasably locking the rotatably mounted base casting 22 with reference to the tripod, there is fastened to the underside of casting 22, as by screw 37, a split circular brake band 38, said band fitting within a circular flange 39 upstanding from plate 20. The brake band is expanded to engage flange 39 by means of an expander wedge head 40 adapted to be forced within the split of the brake band, which wedge head is pivotally carried on the lower end of a screw member 41 screw-threaded in casting 22 and having on its upper end an operating arm 42.

Casting 22 is formed with diametrically opposed extensions 44 and 45, to which are fastened down the two upright bracket arms 46 and 47, respectively, between which is trunnioned the camera cradle now to be described.

The camera body is secured down on a sliding base plate 50 which slides between arms 46 and 47 on cradle 52 trunnioned between the upper ends of said arms, as shown, the parts being arranged so that the horizontal trunnion axis B—B intersects vertical axis A—A previously mentioned. Slide plate 50 is provided with suitable screw-threaded sockets as at 55 and 56 (see Fig. 3), adapted to take usual camera hold-down screws, not shown. To aid in initially positioning the camera on the slide base, suitable corner and side guides as indicated at 57 and 58 may be provided. By these means the camera is accurately located and secured down on the slide base.

The underside of slide base 50 is cut with a dove-tailed groove 60 and the upper side of the horizontal base plate portion 52a of the cradle is provided with a corresponding dove-tailed projection 61, so that slide base 50 and the camera carried thereby are movable on the cradle between arms 46 and 47, or at right angles to the trunnion axis B—B of the cradle, as will be fully apparent from the drawings. Suitable spring shoes, not shown, may be provided between one side of the dove-tailed projection and the grooved portion of the slide base to take up play, if desired.

The means for moving the slide base and camera in the cradle along the dove-tailed slide is shown best in Fig. 5. To the underside of slide base 50 is rigidly secured a nut member 64 through which screw-threads a lead screw 65 mounted to rotate in cradle base 52a. Bearings 66 and 67 are provided for the lead screw at the forward and rearward edges of the cradle base 52a, and a central groove 68 is formed therein to accommodate movement of nut member 64 (see Figs. 3 and 5). The lead screw is formed forwardly of bearing 67 with a flange 69 bearing thereagainst, and mounted on the rearward end of the lead screw is a hand crank 70, a washer 71 being provided between the crank and the forward side of bearing 67 as shown. It will be evident that operation of crank 70 acts through the lead screw and nut 64 to move the slide base 50 and camera carried thereby longitudinally back or forth on the cradle base 52a.

The cradle base 52a is suspended by two arms 74 and 75, the vertical upper ends 74a and 75a of which are trunnioned, as aforementioned, on axis B—B to the upper ends of upstanding bracket arms 46 and 47. The cradle is arranged to accommodate the view finder at the side of the camera, as shown.

The cradle is so arranged that the photographic lens 15 of the camera mounted on the slide base is in a vertical plane passing through the vertical pivot axis A—A of the tripod head and which is at right angles to trunnion axis B—B, and it will be evident that movement of the slide base by means of hand crank 70 moves the lens back and forth in said plane. The cradle is also so arranged that in such longitudinal movement of the camera in the cradle, the photographic camera lens moves in a plane parallel to the cradle base and intersecting the trunnion axis B—B of the cradle. Thus it will be understood that operation of hand crank 70 enables the camera to be shifted longitudinally within the cradle until its lens is in the desired alinement with the intersecting vertical and horizontal pivot axes A—A and B—B, the point of intersection of which axes is the fixed pivot point about which the camera body swings both in horizontal and in vertical movement.

The cradle mounting on bracket arms 46 and 47 is shown best in Fig. 4, where the mounting of cradle arm 74 is shown in section. Journaled in a bearing 80 carried in the upper end of the upstanding bracket arm 46 is a horizontal stud 81, and keyed on said stud, as at 82, and lying immediately adjacent the inner surface of said arm 46, is the upstanding cradle arm end 74a. Next to the cradle arm end, stud 81 carries a forwardly extending counter-balance arm 83, referred to more particularly hereinafter and the inner end of the stud is screw-threaded to receive a retaining nut 84 set up against arm 83 to hold the parts in proper assembly. The other end of stud 81 is screw-threaded to receive a knurled friction adjustment nut 85, which is set up against friction discs 86 to adjust the friction between the stud which rotates with the swinging cradle, and fixed support 46. The mounting of the other cradle arm 75 on support arm 47 is a duplicate of that just described and need not be separately detailed, beyond to note that there is provided on this side also a counter weight arm 83.

The center of gravity of the motion picture camera and the cradle carrying the same is well to the rear of the horizontal axis B—B on which the parts are pivoted, and to counter-balance these parts there are provided the previously mentioned forwardly extending counterweight arms 83, which carry counter-weights 90 at a sufficient distance out to secure the desired balance. Weights 90 preferably are movable longitudinally on arms 83 and are provided with thumb screws 91 adapted to engage arms 83 to fix the weights in position after adjustment. This adjustment is necessary, since with different photographic lenses in the camera it becomes necessary to move the camera and slide-base in the cradle to secure the proper alinement of the nodal point of the lens with the point of intersection of the tripod axes A—A and B—B, and each time the camera is so shifted a readjustment of the counterweights becomes necessary to place the parts again in balance.

Fig. 7 is a diagrammatic view showing a set using a miniature and typifying the use of a camera mounted for panning and tilting movement in accordance with the present invention. In said diagram the floor is designated at 93, the background at 94, the camera and tripod being mounted on floor 93 to take background 94. The ceiling of the set is constructed in miniature and is placed in the foreground as at 95, the miniature being constructed to proper scale and perspective and being located at the proper distance from the lens to compose properly with the balance of the set.

In initially setting up the camera, the hand crank 70 is operated to move the camera body back and forth within the camera cradle until the rear nodal point of the camera lens coincides with the point of intersection of the two pivot axes A—A and B—B of the tripod head. This assures that in any panning or tilting movement of the camera on the tripod during a shot, the initial line-up of the miniature and background will be accurately preserved. This result is secured, as previously mentioned, because when the camera body is swung on the rear nodal point of the camera lens, the entering and emerging angles between objects at different distances from the lens are maintained conjugate to one another. This simply means that the center of perspective positioned by the taking lens at its second nodal point in reference to the field angles remains a fixed point as the camera swings on its axes, and that the perspective or space relations between foreground and background objects once lined up with reference to said nodal point will always remain lined up as the camera swings with angular motion.

Thus with the present invention it becomes possible to take panning and tilting shots of scenes having miniatures composed therein, or, speaking more broadly, of scenes wherever there is a line-up of objects whose perspective relations must not be disturbed during the swinging shot.

It will be understood the drawings and description are to be considered as illustrative of and not restrictive on the broader claims appended hereto, for various changes in design, structure and arrangement may be made in said invention without departing from the spirit and scope of said claims.

We claim:

1. In a panning and tilting mounting for a motion picture camera, the combination of a stationary base, a rotatable member mounted on said stationary base for rotation on a vertical axis, a camera cradle trunnioned on said rotatable member on a horizontal axis intersecting said vertical axis, a camera base adapted to carry a camera, said camera base being slidably mounted on said cradle to carry a motion picture camera mounted thereon into position in the cradle with the camera lens at the point of intersection of said vertical and horizontal axes.

2. In a panning and tilting mounting for a motion picture camera, the combination of a stationary base, a rotatable base mounted on said stationary base for rotation on a vertical axis, a pair of bracket arms extending upwardly from said rotatable base, a camera cradle trunnioned on and between said arms on a horizontal axis intersecting said vertical axis, a camera base adapted to carry a camera, said camera base being slidably mounted on said cradle between said bracket arms to carry a motion picture camera mounted thereon into position in the cradle with the lens of the camera at the point of intersection of said vertical and horizontal axes.

3. In a panning and tilting mounting for a motion picture camera, the combination of a stationary base, a rotatable base mounted on said stationary base for rotation on a vertical axis, a pair of bracket arms extending upwardly from said rotatable base, a camera platform to which the base of a camera may be secured down, a camera cradle slidably supporting said camera platform, the direction of sliding movement between the camera platform and cradle being forwardly and rearwardly with reference to the camera, arms on the cradle extending upwardly around the sides of the camera and trunnioned at their upper ends on a horizontal trunnion axis on the upper ends of the bracket arms that extend upwardly from the rotatable base, said bracket arms being so arranged that said horizontal trunnion axis intersects the vertical axis of the rotatable base, the length of the cradle arms being such that said horizontal trunnion axis is at a distance from the plane of the camera platform equal to the height of the axis of the camera lens above the camera bottom, and the camera cradle and platform being so arranged that the line of movement of the camera lens as the camera platform is moved in the cradle intersects the vertical axis of the rotatable base, all in such manner that the camera and camera platform may be moved on the camera cradle to bring the rear nodal point of the camera lens into coincidence with the intersecting vertical axis of the rotatable base and horizontal trunnion axis of the camera cradle.

4. In a panning and tilting mounting for a motion picture camera, the combination of a stationary base, a rotatable member mounted on said stationary base for rotation on a vertical axis, a camera cradle trunnioned on said rotatable member on a horizontal axis intersecting said vertical axis, a camera base adapted to carry a camera, said camera base being slidably mounted on said cradle to carry a motion picture camera mounted thereon into position in the cradle with the rear nodal point of the camera lens at the point of intersection of said vertical and horizontal axes.

5. In a panning and tilting mounting for a motion picture camera, the combination of a stationary base, a rotatable base mounted on said stationary base for rotation on a vertical axis, a pair of bracket arms extending upwardly from said rotatable base, a camera cradle trunnioned on and between said arms on a horizontal axis intersecting said vertical axis, a camera base adapted to carry a camera, said camera base being slidably mounted on said cradle between said bracket arms to carry a motion picture camera mounted thereon into position in the cradle with the rear nodal point of the camera lens at the point of intersection of said vertical and horizontal axes.

LEWIS L. MELLOR.
HENRY GORDON JENNINGS.
WILLIAM F. RUDOLPH.
ARTHUR SMITH.